Dec. 6, 1960  H. A. LINDAHL  2,963,428
EXTRACTION PROCESS
Filed Nov. 27, 1957
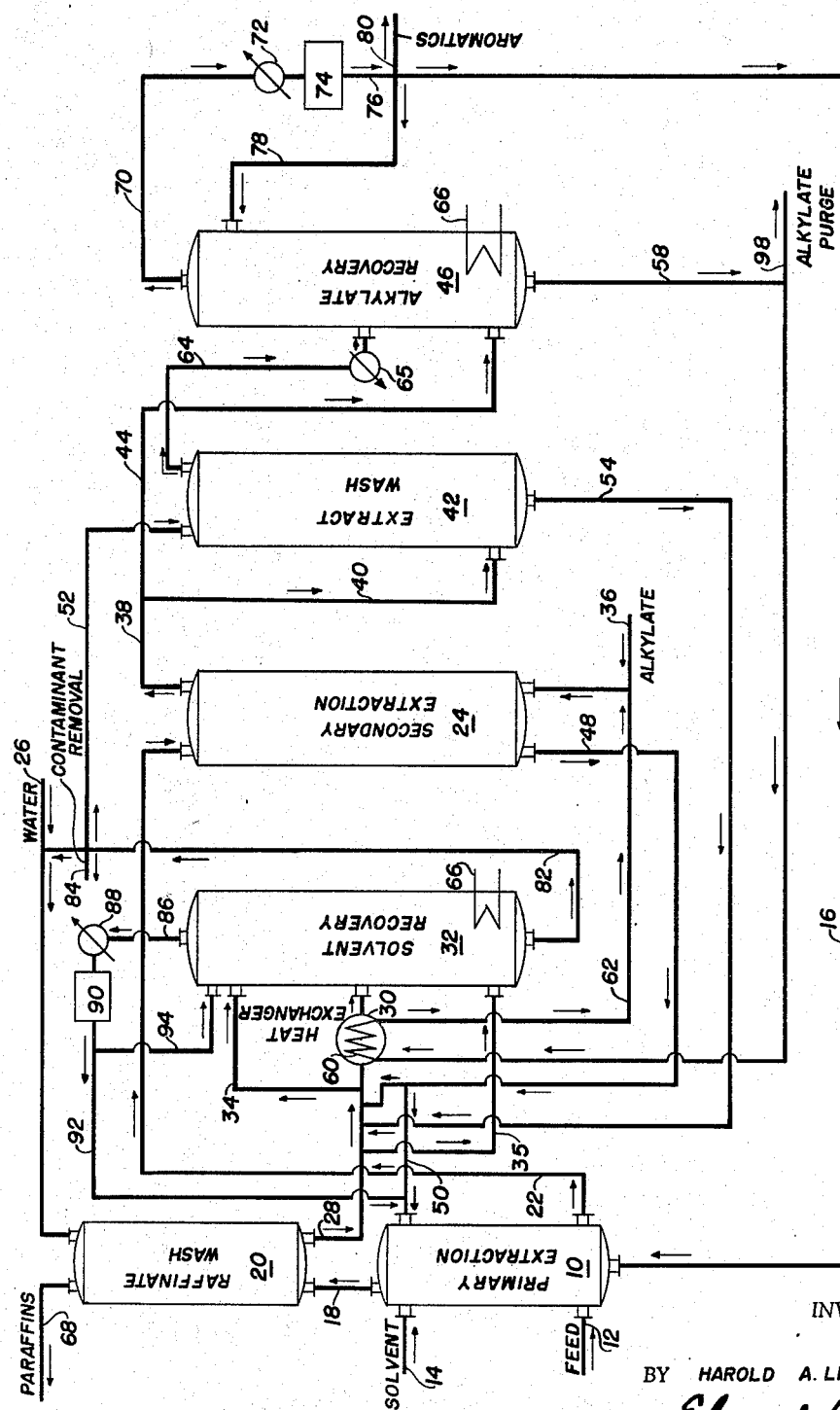
INVENTOR.
BY HAROLD A. LINDAHL
Edward H. Lang
ATTORNEY United States Patent Office 2,963,428
Patented Dec. 6, 1960

2,963,428

EXTRACTION PROCESS

Harold A. Lindahl, Elmhurst, Ill., assignor to The Pure Oil Company, Chicago, Ill., a corporation of Ohio Filed Nov. 27, 1957, Ser. No. 699,216

6 Claims. (Cl. 208—315)

This invention relates to a process for the recovery and purification of an organic component or class of compounds present in admixture with other organic components of the same general class, or of a different class, by employing a particular system of liquid-liquid countercurrent contact of the mixture with a selective solvent for the organic component desired. More particularly, the invention concerns itself with an improvement in the countercurrent, liquid-phase solvent extraction of mixtures of organic components wherein the problem of increase in the concentration of organic components having boiling points close to but higher than the boiling point of the desired organic component is overcome. In one of the embodiments of this invention the build-up of high-boiling hydrocarbons in a system designed to extract one type of hydrocarbon from a mixture of low- and high-boiling hydrocarbons is prevented by providing a solvent-recovery system of improved design.

Even more particularly, this invention relates to the provision of a common solvent-recovery system and clean-up zone in countercurrent solvent extraction systems, to which is directed certain selected solvent-containing streams for recovery of the solvent therefrom, in a manner which prevents the concentration of components from the mixture which otherwise would contaminate the system and the product. Without limiting the invention, one aspect herein comprises the expedient of selecting particular raffinate water-wash streams, controlled portions of the primary solvent recycle stream resulting from the treatment of the extract phase with a heavy alkylate hydrocarbon mixture from an outside source, and a solvent-water stream resulting from the water-washing of the heavy alkylate and solvent phase, produced as an overhead from the production of said controlled portions of primary solvent recycle stream, and subjecting these combined streams to treatment in a common solvent-recovery step. The foregoing steps are applicable to any countercurrent liquid-liquid solvent extraction process wherein the solvent removes a component as an extract and leaves other components as a raffinate, and either or both of these phases are contaminated with other components which tend to build up in the system. Again without limiting the invention, the common solvent-recovery system to be described herein is applicable to the treatment of hydrocarbon mixtures with a selective solvent for the purpose of removing relatively unsaturated or non-paraffinic hydrocarbons from the saturated and more paraffinic hydrocarbons. An example of such a process is the extraction of aromatics and substituted aromatics from reformed naphthas and selected fractions of reformed naphthas containing same.

It becomes, therefore, a primary object of the invention to provide an improved countercurrent, liquid-liquid, solvent extraction process.

Another object of the invention is to provide an improved solvent extraction process and solvent recovery procedure.

Still another object of the invention is to provide an improved solvent-recovery system wherein certain water-wash streams, recycle streams and solvent-water streams are combined and separately treated to recover solvent therefrom.

These and other objects of the invention will be described or become obvious as the description proceeds.

The process of this invention may be stated as providing a means for decreasing the volume of contaminating components that normally are recycled in countercurrent liquid-liquid extraction processes wherein the raffinate phase is treated with water to produce a first solvent-containing stream, the extract phase is treated with a high-boiling hydrocarbon mixture, such as heavy alkylate, to separate a solvent recycle stream as a second solvent-containing stream, and the resulting alkylate-extract stream is further water-washed to produce a third solvent-containing stream. These three solvent-containing streams are sent in certain proportions to a common solvent-recovery and clean-up system from which the heavy contaminants, mixed with water, are removed as high-boiling bottoms, and a solvent-water stream is recovered as overhead for recycle.

The invention is best understood by a brief explanation of the flow of materials through the process as represented by the flow diagram, followed by a detailed explanation of the conditions imposed in each step to bring about the results of this invention. The invention is illustrated in the flow diagram and the experiments herein by the recovery of benzene from a catalytic reformate using dimethyl ammonium dimethyl carbamate and water as the selective solvent.

Referring to the flow diagram, feed hydrocarbons enter primary extraction tower 10 by means of line 12 and are countercurrently contacted with the selective solvent introduced at line 14, and recycle lines 50 and 92. A portion of the aromatics recovered by the process are reintroduced into tower 10 as reflux via line 16. Tower 10 produces two effluent streams, a raffinate stream leaving by line 18 to raffinate wash-tower 20, and an extract stream leaving by line 22 and passing to the top of secondary extraction tower 24. In raffinate wash-tower 20, the raffinate phase is contacted with water from line 26 to produce a first solvent- and water-containing stream leaving tower 20 via line 28 and passing through heat exchanger 30 into solvent-recovery tower 32. A portion of this stream may be by-passed via line 34 into the top of tower 32, and line 35 into the bottom thereof.

The primary extract phase is treated in tower 24 with alkylate, supplied through make-up line 36 and recycle line 62, to produce an overhead or stream comprising alkylate, substantially all of the aromatics from the primary extract phase, and some solvent, which passes through line 38. In one embodiment of this invention a portion or all of this overhead stream passes into line 40 and enters the bottom of extract wash-tower 42. In another embodiment of this invention a portion or all of this stream passes through branch line 44 to enter alkylate recovery-tower 46. A second effluent, containing substantial proportions of solvent utilized in accordance with this invention, is produced by secondary extraction-tower 24. This second, solvent-containing stream leaves tower 24 by line 48. A portion or all of same enters line 50 as recycle solvent in primary extraction-tower 10, and the remainder combines with the first solvent- and water-containing stream 28 to flow to solvent recovery-tower 32.

Extract wash-tower 42 receives water from line 52 and produces a third solvent-containing stream utilized in accordance with this invention. This stream leaves tower 42 by line 54 and joins stream 28 from wash-tower 20. The combined streams in line 28 are heated in heat exchanger 30 by means of hot alkylate coming from alkylate recovery-tower 46. This hot alkylate passes through line 58 and coil 60, and joins line 36 via return-line 62. As a result of the water wash in wash-tower 42, an overhead alkylate-aromatic stream is produced and conveyed through line 64, and heat exchanger 65, to alkylate recovery-tower 46. Heating means 66 are provided in towers 46 and 32. Paraffins are removed from tower 20 via line 68. Aromatic products are recovered as overhead from tower 46 via line 70, passing through condenser 72 into receiver 74, and thence into line 76 from which a first portion may be recycled to tower 46 via line 78, a second portion may be withdrawn as product through line 80 for water washing or other further means of purification, and a third portion may be recycled to tower 10 through line 16.

The distillation of the combined heated streams of solvent in tower 32 results in the separation of a water phase which contains heavy aromatics and is withdrawn from the tower as bottoms through line 82. A portion of this phase may be withdrawn at line 84 and other, controlled portions sent into lines 26 or 52. Tower 32 also produces a concentrated solvent phase, taken off as overhead in line 86. This phase is passed through condenser 88 and into receiver 90. A portion of this recovered solvent is recycled to tower 10 via lines 92 and 50 and a portion is used as recycle, transferred through line 94, for recovery-tower 32. Line 58 is equipped with alkylate purge-line 98, through which a portion of the recycle alkylate may be withdrawn to remove heavy aromatics contained therein from the system.

The various valves, controls, pumps and other auxiliary equipment used to transfer and control the flow of the various streams through the system have been omitted from the diagram for simplicity. The feed may be introduced at ambient temperatures or preheated to about 100° to 180° F., which is the preferred temperature range for the operation of tower 10. The feed may be passed through a heat exchanger, containing a heating coil of sufficient capacity to increase the temperature of the feed stock to the desired extraction temperature, and then may be pumped at about 1 to 15 atmospheres pressure into tower 10. The feed stock at the desired pressure and temperature may be charged into extraction tower 10 at a point intermediate between the top and bottom of the tower at a rate of between about 100 to 10,000 bbl. per day.

The solvent used may be any normally liquid material which has a selective solvency for the particular compound or class of compounds sought to be separated. Suitable solvents include methyl ethyl ammonium methyl ethyl carbamate and dimethyl ammonium dimethyl carbamate. The solvent phase has the higher density and, accordingly, is introduced above the point of entry of the feed stock. Towers 10, 20, 24 and 42 are arranged with suitable contacting and dispersing means therein to obtain intimate contact between the liquid phases. Berl saddles, sieve plates, and other known means may be used. Recovery towers 32 and 46 are equipped with plates to aid in the separation of component fractions therein. The recycle stream of aromatics flows through line 16 at a rate of about 0.5 to 10 bbl. per bbl. of fresh feed stock.

Those processes which employ a non-volatile solvent, subject the extract phase to distillation, and water-wash the raffinate, do not provide against the accumulation of heavy aromatics in the system. Some processes employ a common still for the separation of the water-solvent mixtures from both the extract and raffinate phases into their components, and a vacuum still for the denuded extract phase after treatment with pentane. Such a procedure allows the heavy aromatics to be carried back with the solvent and other recycled streams. The present process eliminates thesse difficulties by using a portion of the solvent-free, recycled wash-water stream from the solvent-recovery tower as a carrying agent to eliminate most of the heavy aromatics from the system. The remainder of the heavy aromatics are withdrawn in an alkylate stream which can be used in motor fuel or for other purposes.

This procedure also permits automatic adjustment of the water content of the solvent. Thus, the primary solvent in which a particular amount of water is desired is introduced into tower 10 at lines 14, 50 and 92 from the solvent-recovery system, and contains about 10–20% by weight of water.

The preferred high-boiling material used to remove aromatics from the primary extract phase comprises heavy alkylates or other paraffinic hydrocarbons having boiling points greater than those of the aromatics to be recovered. The alkylate, for example, may be produced by treating a feed comprising isobutane and butylenes in the presence of a catalyst made up of 92% sulfuric acid or anhydrous hydrofluoric acid at a temperature of about 30° F. to 100° F. and a pressure of about 50 p.s.i.g. The properties of the preferred heavy alkylate are given in the following table:

TABLE I

*Properties of alkylate*

| Characteristic: | Value |
|---|---|
| API gravity _____degrees__ | 54 |
| Boiling range _____° F__ | 400–450 |
| Percent paraffins _____ | 60 |

Primary extract enters secondary extraction-tower 24 at a flow rate of about 400 to 75,000 barrels per day, a temperature of about 50° F. to 150° F., and a pressure of about 10 to 100 p.s.i.g.

In the operation of the process, it was observed that some of the heavy aromatic contaminants boil within the range of the secondary solvent, or alkylate, introduced at line 36. These contaminants, accordingly, accumulate in the stripped alkylate leaving tower 46 through line 58. Therefore, a portion of this alkylate, which is also well-suited as a gasoline component because of the high-boiling aromatic content, is removed at line 98. Alkylate to replace this withdrawal is introduced at line 36.

The prior art processes ordinarily provide various solvent recovery and recycle procedures, and often entail both a primary solvent-recovery tower from the water-wash streams and a tower to remove the contaminants from the primary, solvent recycle stream. In accordance with this invention, it has been found that such procedures require exceedingly high reflux ratios in the primary solvent-recovery tower (as in tower 32) and also high heat. It has been found that by combining the water-wash streams (lines 28, 54) with the recycled primary solvent (lines 56 and 94), and subjecting the entire mixture to a single distillation in tower 32, the high primary solvent content leads to practical reflux ratios and significant economies in operation. Purified primary solvent containing the proper amount of water is thus obtained in line 86 and is conducted through lines 92 and 50 as recycle to tower 10. By this means the concentration of contaminating, high-boiling materials is prevented from building up in the recycled primary solvent, and the concentration thereof is maintained at an acceptable low level. The residue from this distillation (line 82) is primarily water and heavy aromatic contaminants which on withdrawal at line 84 may be cooled, separated and the water recycled through line 26.

The superiority of the present process over the earlier two-column system is illustrated by the following comparison of process conditions, and tower, reflux and heat requirements.

TABLE II

| | Earlier Process | | This Process— Single Column |
|---|---|---|---|
| | Recovery Column | Clean-up Column | |
| Minimum reflux ratio req'd ($R_m$)_____ | 10 | 0.26 | 0.50 |
| Selected actual reflux ratio $R/R_m$_____ | 1.25 | 1.25 | 1.25 |
| Actual reflux ratio_____ | 12.5 | 0.5 | 0.625 |
| Theoretical plates _____ | 8 | 8 | 8 |
| Column diameter req'd, ft _____ | 5.5 | 5 | 7.5 |
| Heat requirement, B.t.u./hr_____ | 14.5 | 23.2 | 27 |

From the foregoing data it is apparent that considerable savings in power, materials of construction, and the reflux ratios employed in the solvent recovery system are made possible by the process of this invention as compared with the multi-step procedure of the prior art, while at the same time preventing the build-up of undesirable high-boiling materials within the system. This is accomplished by the procedure of conducting all of the solvent-containing and solvent- and water-containing effluent streams from the processing steps to a solvent-recovery tower in admixture with the primary solvent recycle stream from the extract wash-step. This procedure allows recovery of heat from the alkylate stream (58) coming from the alkylate recovery-tower 46 and passing through heat exchanger 30. The combined heating and mixing of these solvent, water, and contaminating hydrocarbon streams in solvent recovery-tower 32 results in, quite unexpectedly, the separation of these high-boiling materials from the solvent phases and also reduction in reflux ratios and heat requirements.

Primary extraction tower 10 is operated under conditions which produce an extract phase rich in aromatics leaving at line 22. Temperatures of from 100° to as high as 180° F. at pressures of atmospheric to 10 p.s.i.g. may be used in tower 10. The preferred conditions of extraction for highest efficiency and economy of operation are 100° to 120° F. at 5 p.s.i.g. Solvent/feed ratios may vary from 1:10 to 10:1 and ratios of about 5:1 are preferred.

Raffinate wash-tower 20 is operated under conditions to wash the carbamate solvent from the raffinate or paraffinic phase. The water in line 26 is introduced at about 80° F. or cooler and the raffinate in line 18 enters at the temperature of the primary extraction. Thus, tower 20 may be operated at temperatures ranging from 30° F. to about 140° F. under the same pressure conditions as tower 10. Water-to-raffinate feed ratios of from 0.3:1.0 to 0.5:1.0 are used for this purpose.

Secondary extraction tower 24 is operated under conditions to promote the extraction of the aromatic content of the extract phase by the high-boiling alkylate hydrocarbons entering at line 36. Temperatures of from 30° to 140° F. and pressures up to 30 p.s.i.g. may be used for this purpose. In general, the heat exchange taking place in heat exchanger 30 is adjusted to provide a substantial portion of the heat required for solvent-recovery tower 32 and produce a cooled alkylate in line 62 which is at the proper temperature for the operation of tower 24. This is accomplished by control of the amounts and rates of flow of the streams 28, 48 and 54, through control also of the by-pass streams 34 and 35.

Extract wash-tower 42 is operated under conditions commensurate with the process streams 38 and 52 entering same with the purpose being to wash the carbamate solvent from the alkylate-aromatic-extract stream. Temperatures of about 100° to 120° F. and atmospheric pressures are used in tower 42. The alkylate recovery tower requires the application of heat to bring the alkylate stream 44 and/or 64 to the boiling point of the aromatic being recovered which, may be from about 100° F. to 250° F. using pressures up to 30 p.s.i.g. The amount of reflux in line 78 is about 2:1 to 8:1 as compared with the feed in lines 64 and 44.

In general, stable, N-substitued alkyl carbamates may be advantageously used to carry out the present process, although dimethyl ammonium dimethyl carbamate has been used to illustrate the invention. This compound is a water-white liquid, boiling at about 140.3° F., having a specific gravity of 1.026, an absolute viscosity at 25° C. of 63.3 cps., and a refractive index at 25° C. of 1.4512. Another example is methyl ethyl ammonium methyl ethyl carbamate, boiling at about 131° F., which is also a stable liquid. Certain ammonium derivatives of N-substituted carbamates lack stability, such as the methyl-methyl compound, the ethyl-ethyl compound and the diethyl-diethyl compound, along with certain higher molecular weight derivatives such as the 1-propyl, and n-octyl compounds. As a consequence, these materials cannot be used. Certain other ammonium derivatives of N-substituted carbamates, such as the benzyl-benzyl compound, are solids and either have to be used with an auxiliary solvent or employed at higher temperatures during the extraction. Thus, benzyl ammonium benzyl carbamate and ethyl phenyl ammonium ethyl phenyl carbamate would be used at temperatures above 100° C. (212° F.) in the present process. The boiling point of the carbamate solvent should be within about 100° F. of the boiling point of the major portion of the non-aromatic hydrocarbon in the feed. If the solvent boils at about 20° to 80° F. from the boiling point of the paraffins, good separation is obtained. This means that for practical reasons the paraffinic and aromatic hydrocarbons that may be separated by this process are limited to those which have between about six to nine carbon atoms per molecule.

The process of this invention is carried out in accordance with known methods in the extraction industry with the modifications herein asserted. Any liquid-liquid or liquid-vapor contact method effective in solvent extraction processes may be used. The feed may be treated in one tower or a series of towers, and with one or more successive portions of the carbamate solvent. The portions of solvent used in each successive treatment may vary in accordance with the extent of extraction sought. The process may be batchwise or continuous, and countercurrent flow in a vertical tower may be used.

The process of this invention is applicable to the treatment of any type of hydrocarbon mixture from which economical amounts of aromatics, including benzene and alkyl homologues thereof, can be recovered. Such mixtures include products obtained from aromatization and similar reactions. The products obtained from catalytic reforming, hydrocracking and dehydrocyclization processes may be used as feed for the present process. Any mixtures containing a paraffinic- or naphthenic-type hydrocarbon admixed with benzene, toluene, the xylenes, that is, o-xylene, m-xylene and p-xylene, and also ethyl benzene, as simple or complex multi-component mixtures, may be used as the starting material. Such feed materials as petroleum distillates, naphthas, gasoline, kerosene, fuel oil fractions, and gas-oil fractions may be used. The charge material should be liquid at ordinary temperatures and not subject to decomposition at the extraction temperatures or reaction with the selective solvents used herein. One suitable charge oil is the class of products known in the art as catalytic reformates. These liquid products contain a fair concentration of desirable aromatic hydrocarbons. Catalytic reformates are obtained by treating naphthas to reforming, dehydrogenation, hydrocracking and dehydrocyclization reactions at temperatures ranging from 850° F. to about 1000° F. with pressures up to 500 p.s.i.g. in the presence of a metal-containing catalyst.

As a more specific illustration, catalytic reformates obtained as a result of the treatment of a virgin naphtha (b. 175° F.–400° F., API gravity 50° to 60°) with a platinum-alumina catalyst at 875° F. to 975° F. and pressures ranging from 200 to 500 p.s.i.g. may be used. Reformates so produced contain from about 30 to 55 vol. percent of aromatics and constitute a preferred feed for the present process. For example, reformates produced by reforming a 200°–400° F. virgin naptha at about 930° F. and 325 p.s.i.g., in the presence of a catalyst comprising about 0.1 wt. percent of platinum on an alumina base, are representative. In general, these reformates have a boiling range of about 125° to 400° F., and API gravity of 40° to 50°, and an aromatic content of 45–55 volume percent. A particularly suitable reformate is obtained by subjecting a charge naptha having a boiling range of 178° F. to 389° F., an API gravity of 59.1°, a RON, clear of 44.6, a RON+0.3 TEL of 71.4 and containing 0.01% sulfur, about 91.0 vol. percent of paraffins and naphthenes, 1.0 vol. percent olefins, and 8.0 vol. percent aromatics, to reforming at about 930° F., to produce a product having an API gravity of 49.2°, an IBP of 128° F., an EBP of 405° F., a RON, clear, of 89.4, a RON+.3 cc. TEL of 98.2, and containing about 48.0 vol. percent paraffins and naphthenes, 1.0 vol. percent olefins and 51.0 vol. percent of aromatics. By precise fractionation and blending to different octane numbers, it was determined that this reformate feed material exhibited the following analysis:

TABLE III

*Aromatics in reformate feed*

| Aromatic: | Vol. percent |
|---|---|
| Benzene | 4.19 |
| Toluene | 13.1 |
| Mixed xylene and ethyl benzene | 16.51 |
| $C_9$ and heavier | 17.2 |

Examples of the composition of other reformate feed hydrocarbons that may be used are shown in Table IV giving the volume percent of aromatics in each, and the research octane level to which the reforming reaction was directed in each instance.

TABLE IV

*Aromatics distribution in various reformates* [1]

(Volume Percent)

| Aromatic | 85 Research Octane Level | 95 Research Octane Level |
|---|---|---|
| Benzene | 2.96 | 3.41 |
| Toluene | 9.64 | 12.9 |
| Ethyl-benzene | 2.55 | 2.72 |
| p-xylene | 2.74 | 2.83 |
| m-xylene | 6.45 | 6.73 |
| o-xylene | 3.96 | 3.81 |
| $C_9$ and heavier aromatics | 17.3 | 22.4 |
| Total | 45.6 | 54.8 |

[1] These reformate products were from different feed stocks.

In general these feed stocks contain a mixture in various proportions of i-butane, n-butane, i-pentane, n-pentane, cyclopentane, 2,2-dimethylbutane, 2,3-dimethylbutane, 2-methylpentane, 3-methylpentane, n-hexane, methylcyclopentane, 2,2-dimethylpentane, benzene, 2,4-dimethylpentane, cyclohexane, 2,2,3-trimethylbutane, 3,3-dimethylpentane, 1,1-dimethylcyclopentane, 2,3-dimethylpentane, 2-methylhexane, cis-1,3-dimethylcyclopentane, trans-1,2-dimethyl cyclopentane, 3-ethylpentane, n-heptane, 2,2,4-trimethylpentane, cis-1,2-dimethylpentane, methylcyclohexane, methylethylcyclopentane, and other $C_8$ hydrocarbons, toluene, ethylbenzene, p-xylene, c-xylene and m-xylene. These represent the types of hydrocarbon mixtures from which the aromatics, as enumerated, can be separated by the present process. In using reformates as feed hydrocarbons, one purpose is to separate the low-octane components so that they may be recycled or otherwise upgraded in octane number, and the high-octane products recovered for gasoline blending.

Another type of feed mixture comprises various fractions and mixtures of fractions of reformates which may be used in this invention. For example, a reformate or other source of aromatics may be fractionated to form a benzene concentrate, a toluene concentrate and a xylene concentrate; these may be individually treated or mixed in various proportions and treated to solvent extraction in accordance with this invention to obtain products having a high concentration of the desired aromatic. One such feed material comprises a synthetic mixture of 1 part benzene concentrate, 2 parts toluene concentrate and 1 part xylene concentrate. The purpose of treating such concentrates is to recover aromatics of maximum purity tor use as organic intermediates, solvents, etc.

What is claimed is:

1. The process for the separation of aromatic hydrocarbons from hydrocarbon mixtures containing aromatic hydrocarbons of different boiling points in admixture with non-aromatic hydrocarbons, which comprises contacting said hydrocarbon mixture with an N-substituted carbamate solvent in a primary extraction zone, separating an aromatic hydrocarbon solvent extract and a non-aromatic raffinate from said primary extraction zone, washing said non-aromatic raffinate with water in a raffinate wash zone, separating a purified raffinate and a first solvent-water-containing mixture from said raffinate wash zone, contacting said aromatic hydrocarbon solvent extract with a paraffinic hydrocarbon, having a boiling point above the boiling point of the desired aromatic hydrocarbons in said hydrocarbon mixture, in a secondary extraction zone, separating a solvent-containing raffinate and an aromatic hydrocarbon-paraffinic hydrocarbon extract from said secondary extraction zone, contacting said aromatic hydrocarbon-paraffinic hydrocarbon extract with a water-heavier aromatic hydrocarbon bottoms, subsequently to be defined, in an extract wash zone, thereby separating said last-mentioned extract into a second solvent-water-containing mixture and a paraffinic hydrocarbon-aromatic hydrocarbon fraction in said extract wash zone, heating said paraffinic hydrocarbon-aromatic hydrocarbon fraction in an aromatic hydrocarbon recovery zone, recovering an overhead comprising the desired aromatic hydrocarbons and a bottoms comprising hot paraffinic hydrocarbons containing said heavier aromatic hydrocarbons from said aromatic hydrocarbon recovery zone, heating said first and second solvent-water-containing mixtures along with said solvent-containing raffinate in a solvent recovery zone, separating an overhead comprising substantially concentrated solvent and a water-heavier aromatic hydrocarbon bottoms as bottoms from said solvent recovery zone, recycling at least a portion of said water-heavier aromatic hydrocarbon bottoms to said extract wash zone, and separating a portion of said hot paraffinic hydrocarbon bottoms containing said heavier aromatic hydrocarbons to prevent the build-up of the latter in the system.

2. The process in accordance with claim 1 in which a portion of the water-heavier aromatic hydrocarbon bottoms is withdrawn from the process.

3. The process in accordance with claim 1 in which said paraffinic hydrocarbon comprises an alkylate having a boiling range of about 400–450° F. produced by the reaction of isobutane and butylenes at about 30–100° F. in the presence of a mineral acid catalyst and the hydrocarbon mixture separated is a reformate containing about 30–55% by volume of aromatic hydrocarbons.

4. The process in accordance with claim 1 in which said solvent contains about 10% to 20% by weight of water during contact in said primary extraction zone and the water content of said substantially concentrated solvent from said solvent recovery zone is maintained within about 10% to 20% by weight.

5. The process in accordance with claim 1 in which a portion of the water-heavier aromatic bottoms is recycled to said raffinate wash zone.

6. The process in accordance with claim 1 in which said N-substituted carbamate solvent is selected from the group of dimethyl ammonium dimethyl carbamate, methylethyl ammonium methylethyl carbamate and ethylphenyl ammonium ethylphenyl carbamate.

References Cited in the file of this patent

UNITED STATES PATENTS

| 2,385,645 | Polly et al. | Sept. 25, 1945 |
| 2,594,044 | Loder | Apr. 22, 1952 |
| 2,727,848 | Georgian | Dec. 20, 1955 |